March 29, 1966 C. R. WINSTON 3,243,510

LOW NOISE LINE KEYER

Filed June 22, 1962

INVENTOR
CHARLES R. WINSTON

BY R. C. Terry
ATTORNEY

United States Patent Office 3,243,510
Patented Mar. 29, 1966

3,243,510

LOW NOISE LINE KEYER

Charles R. Winston, Deerfield, Ill., assignor to Teletype Corporation, Skokie, Ill., a corporation of Delaware Filed June 22, 1962, Ser. No. 204,356
9 Claims. (Cl. 178—75)

This invention relates to signal generators and more particularly to a low noise electronic line keyer for telegraph systems.

Prior to this invention the common approach utilized in line keyers for most telegraph systems involved one or the other of two systems which opened and closed a mechanical switch which was connected across the end terminals of the telegraph line or in series in a loop.

One of these prior art systems uses a rotating distributor having a plurality of segments, each of which corresponds to a particular code element of each of the telegraph signal characters transmitted. Each of the segments is energized or deenergized from one side of the line according to the code permutation and a brush connected to the other side of the line rotates past the segments to open and close the line in accordance with the particular code permutations for each character.

The second system commonly used comprises a pair of contacts which are connected respectively to the end terminals of the line and which are opened and closed in accordance with the permutations of the telegraph signals it is desired to transmit.

Both of these systems open and close a mechanical switch which is connected in series with the line battery. The full line potential is applied across the switch when it is open and the full line current flows through it when it is closed. As a result of the relatively high current and high voltage applied across these contacts, some arcing occurs, and radio frequency (FR) noise or interference is generated. For ordinary telegraph applications the arcing is of such a character that only negligible pitting of the contacts takes place, and the RF radiated interference which occurs is of no concern.

However, some present day telegraph systems are operated in sensitive areas where RF generated noise above a predetermined low level is intolerable; and it has been found that telegraph line keyers of the standard type used in the prior art, as described above, generate RF noise which is above this predetermined allowable level.

Accordingly, it is an object of this invention to provide a line keyer which does not radiate or conduct out onto the line any RF noise in the frequency range of 14 kilocycles to 100 megacycles having a magnitude of over .07 microvolt.

It is another object of this invention to provide a low noise line keyer by connecting a transistor across the signal line terminals for controlling the current flow through the line by varying the conduction of the transistor in response to signals representing the information to be transmitted.

It is another object of this invention to provide a low noise transistorized telegraph line keyer in which the transistors are prevented from being driven into saturation or cutoff.

It is a further object of this invention to provide a low noise signal generator for telegraph systems in which the mechanical contacts of the signal generator have only a low voltage applied across them and conduct a current which is considerably less than the line current when they are closed.

It is a further object of this invention to provide a low noise telegraph signal generator by utilizing the opening and closing of conventional contacts in a telegraph signal generator to control the conduction of an output transistor, the emitter-collector path of which is connected across the line terminals, to thereby control the line current flow from a maximum value to a minimum value higher than zero in response to the closing and opening, respectively, of the contacts.

In a preferred embodiment of this invention, the collector-emitter path of a control transistor is connected in series in a telegraph loop or across the end terminals of a conventional telegraph line having therein a line battery. The conduction of this transistor is controlled by changing the bias potential applied to its base in response to the opening and closing of conventional signal generator contacts located in a telegraph keyboard or transmitter distributor. The signal generator contacts have applied thereacross a low voltage which is obtained from a local battery. Current limiting resistors are connected in a series with the contacts to limit the current flow through the contacts to an extremely low level, so that arcing across the contacts when they are operating is reduced to a minimum.

In order to eliminate conducted RF noise, the contacts and their associated current limiting resistance circuit are connected through a low pass filter across the base-emitter terminals of an input transistor. The operation of the contacts is such that when they are open, the input transistor conducts more current than it does when the contacts are closed. The current flowing through the input transistor also passes through a resistance which causes the voltage across that resistance to vary in accordance with the amount of current being drawn by the input transistor. As a consequence, the output potential on the collector of the input transistor varies from a low value when the contacts are open to a high value when the contacts are closed. This potential is utilized to vary the bias potential applied to the base of the control transistor and causes it to conduct a high current when the contacts are closed and to conduct a low current when the contacts are open.

A string of diodes is connected between the local battery and the collector of the control transistor to clamp the collector of the control transistor to a predetermined potential which is outside the saturation region of the transistor, thereby preventing the transistor from saturating regardless of the amount of current flowing through it. Another string of diodes is connected between the emitter of the control transistor and the power supply to prevent the transistor from being cut off when the bias potential applied to its base drives it to near cutoff.

When the control transistor is conducting its maximum current, the current through the line is the desired line current which commonly represents a mark on the line and when the transistor is conducting its minimum value of current, the line current is almost zero. However, a small amount of current is conducted by the transistor so that the transistor is not cut off, and as a consequence, no RF noise is generated by the transistor. For all practical purposes this small amount of current is effectively the same as the zero current, formerly applied to the line in the prior art systems to represent space.

Various other objects and features of this invention will become apparent to those skilled in the art upon consideration of the following detailed specification taken in conjunction with the drawing in which.

Figures 1, 2:
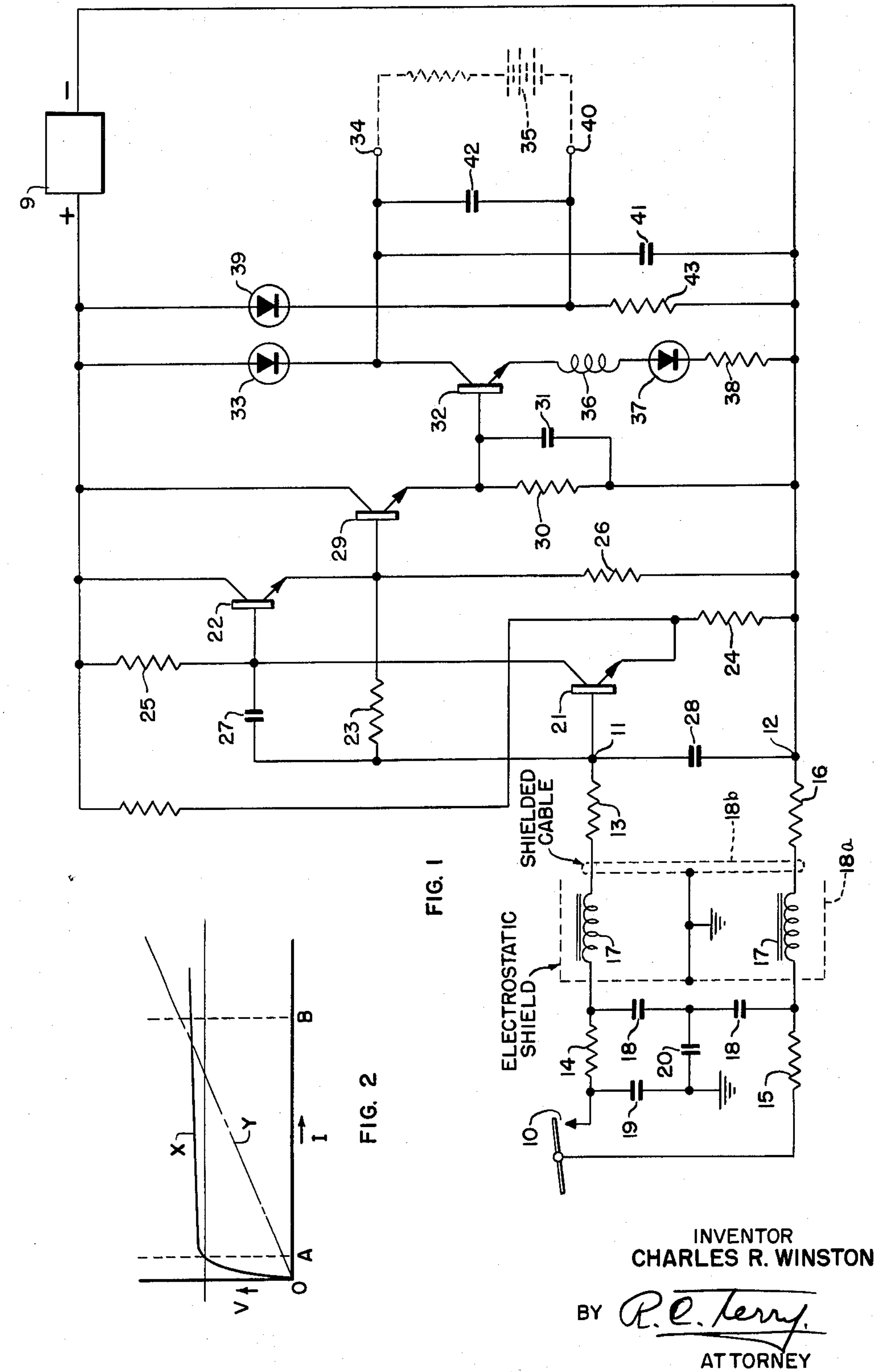
FIG. 1 shows a preferred embodiment of this invention.
FIG. 2 shows wave forms useful in describing the operation of a portion of the circuit shown in FIG. 1.

In a preferred embodiment of the invention, shown in FIG. 1, a conventional signal generator contact assembly 10 is used to generate the mark and space signals which are applied to the electronic line keyer of this invention for causing the desired line currents to be supplied to a telegraph loop or line. The signal generator contacts 10 may be operated by a conventional telegraph signal generator such as shown in Patent No. 2,795,646, issued June 11, 1957, to G. Sim or a rotating distributor type of signal generator such as shown in Patent No. 2,293,077, issued August 18, 1942, to L. M. Potts, may be used. The mechanism and circuitry for operating the contacts 10 forms no part of this invention and no further discussion is presented regarding such apparatus.

A potential is maintained across a pair of terminals 11 and 12 for supplying current to the contact assembly 10. The potential across terminals 11 and 12 is obtained from a local regulated D.C. power source 9, shown on the upper right-hand side of the drawing, through a circuit which will be more fully described hereinafter. The power source 9 is preferably of the type shown in FIG. 1 of the copending application, Serial No. 204,569, filed June 22, 1962, to C. R. Winston. When the contacts 10 are open, thus representing a space in ordinary telegraph applications, no current flow takes place between the terminals 11 and 12. When the contacts 10 are closed, representing a mark in ordinary telegraph applications, current flows between the terminals 11 and 12 through the contacts. This current is limited by current limiting resistors 13, 14, 15 and 16 which are connected in series with the contacts 10. These current limiting resistors are used to reduce the current flowing through the contacts to an extremely low value and the potential available across the terminals 11 and 12 is also maintained at a low value. With only a low potential and a low current available in this portion of the circuit, arcing across the contacts 10, when they are being opened and closed according to the telegraph signals to be applied to the line, is kept at a minimum. As a consequence, any RF noise or interference generated by the opening and closing of the contacts is limited to an amount which is considerably less than the RF interference generated when the contacts 10 are connected in series with the line battery as in conventional telegraph systems.

The signal which is generated by the operation of the contacts 10 is filtered through a low-pass inductance-capacitance filter comprising a pair of inductors 17 and a pair of capacitors 18. This filter serves two functions, namely that of eliminating any conducted RF noise from being applied to the terminals 11 and 12 and that of shaping the generated wave form by rounding off any sharp transitions in it in order to prevent the generation of RF noise in other portions of the low noise line keyer to be described hereinafter.

In order to prevent even the small amount of RF noise generated by the contacts from being radiated across the low-pass filter and from being applied to the terminals 11 and 12, an electrostatic shield **18*a* is placed between the contact box housing the contacts 10 and the inductors 17. The leads connecting the inductors 17 to the resistors 13 and 16 and the terminals 11 and 12 also are shielded by an electrostatic shield 18*b* as a further precaution to prevent RF noise radiated from the contacts 10 from being applied to the terminals 11 and 12**.

A capacitor 19 is connected between the chassis ground of the telegraph transmitter and the junction of the current limiting resistor 14 with the right-hand contact 10 when the contact assembly 10 is of the type used in the aforementioned Sim patent. The addition of the capacitor 19 is necessary due to the inherent characteristics of the particular contact assembly used, since the distributed capacitances between the chassis and the right-hand and left-hand contacts 10 are inherently unequal. The capacitor 19 merely balances these capacitances so that the balanced filter comprised of inductances 17 and capacitances 18 operates at maximum efficiency. Use of a different type of contact assembly might require a different location for the capacitor 19 or it might not even be necessary to use such a capacitor. However, in order to eliminate the maximum amount of RF conducted interference from the system, it is necessary that the distributed capacitance on both of the contacts 10 be the same if a balanced RF filter arrangement is used in the circuit.

The performance of the filter comprising the inductance 17 and capacitance 18 is further improved by connecting a capacitor 20 between the chassis ground and the junction of the capacitors 18. The reasons for the improved operation are presently unknown.

The signals generated by the operation of the contacts 10 are applied to the terminals 11 and 12 and vary the conduction of a pair of NPN transistors 21 and 22 which are interconnected in a degenerative circuit configuration. When a transistor saturates or when it is fully cut off, the transistor generates RF noise which may be conducted or radiated to other portions of the circuit. In order to avoid the generation of RF noise by the transistors 21 and 22, the circuit connections between them cause these transistors to be operated class A, that is, they are never driven to saturation or to cutoff.

When the contacts 10 are opened, representing a space, an infinite impedance is connected across the terminals 11 and 12. With the circuit in this condition, the transistor 21 is biased to conduction by a current flowing from the positive side of the power supply 9 through the transistor 22 and a resistor 23 to the terminal 11 from which it flows through the base-emitter path of the transistor 21 and a resistor 24 to the negative side of the power supply 9. The transistor 21 then draws current through a resistor 25 which is connected between its collector and the positive side of the power supply 9.

The base of the transistor 22 is connected to the junction of the resistor 25 and the collector of the transistor 21. Thus, the potential on the collector of the transistor 21 is applied to the base of the transistor 22 as a bias potential. Proper choice of the circuit parameters causes a predetermined potential to appear on the emitter of the transistor 22 by reason of the voltage drop across a resistor 26 connected in the emitter circuit of that transistor. This potential is the quiescent space signal of the circuit and is of a relatively low value since the transistor 21 is in a relatively high conductive state causing the potential on the base of the transistor 22 to be low, which in turn causes the current conduction of the transistor 22 to be low.

When the contacts 10 are closed, representing a mark condition, current flows through the contacts from the terminal 11 to the terminal 12; and a finite impedance, the value of which is determined by the resistance of the circuit between the terminals 11 and 12, is inserted between the base of the transistor 21 and the negative side of the power supply 9. The result of the insertion of this impedance is to tend to cause the base of the transistor 21 to be driven to a more negative potential with respect to the potential on its emitter, thereby reducing the current flow through it. This tends to cause an increase in the potential on the collector of the transistor 21, and this increased potential is applied to the base of transistor 22 causing it to conduct more heavily. As a consequence the potential on the emitter of the transistor 22 rises, and increased current is conducted through the resistors 23 and 26.

The current conducted by the transistor 22 rises sufficiently to cause the potential applied to the terminal 11 through the resistor 23 and thus to the base of the transistor 21 to rise and counteract the tendency for the base of the transistor 21 to be driven more negative by the closing of the contacts 10. As a result, the potential on the base of the transistor 21 tends to be maintained constant at the value which it was during the space or first quiescent conducting condition of the transistors 21 and 22. The gain of this portion of the system is determined primarily by the impedance of the resistor 23 which may be varied to suit the particular applications in which the system is to be used. The potential on the base of the transistor 21 during the operation of the system varies less than .1 of a volt between the space and mark conditions of the circuit.

The output available at the emitter of the transistor 22 is proportional to the impedance connected between the base of the transistor 21 and the negative side of the power supply 9. Capacitors 27 and 28 interconnect the transistors 21 and 22 to prevent parasitic oscillation from taking place in the portion of the system in which these transistors are used.

The output potential on the emitter of the transistor 22 is applied to the base of an emitter-follower transistor 29, the collector of which is connected to the positive side of the power supply 9 and the emitter of which is connected through a resistor 30 to the negative side of the power supply 9. In order to filter out any RF noise which might be generated in the circuit up to this point, a capacitor 31 is connected between the emitter of the transistor 29 and the negative side of the power supply 9. It should be noted that none of the transistors 21, 22 or 29 is ever driven to saturation or cutoff so that little or no RF noise is generated in these transistors. The capacitor 31 is used to lower the impedance in the base of a control or current driver transistor 32 to prevent the generation of noise in the transistor 32. If the input impedance in the base of the transistor 32 were high, intolerable RF noise would be generated.

The output of the emitter follower 29 is applied to the base of the transistor 32 to control the conduction through the transistor 32 in accordance with the signal variations which occur on the emitter of the transistor 22. The collector of the transistor 32 is connected through a string of diodes 33 (as represented by a single diode symbol in a circle) to the positive side of the power supply 9 and also is connected to a terminal 34 of the telegraph signal line. When a high potential, representing a mark or closed condition of the contacts 10, is applied to the base of the transistor 32 from the emitter of the transistor 29, the transistor 32 conducts heavily and draws the desired line current for mark through the line from a line battery or D.C. source 35 which has been shown in dotted lines since it forms no part of the circuit of this invention. This line current flows from the positive side of the line battery 35 through the terminal 34 and the collector-emitter path of the transistor 32 from which it flows through an inductor 36, a string of diodes 37, a resistor 38, the local power supply 9 and a string of diodes 39 to the other side of the signal line at a terminal 40 which is connected to the negative side of the line battery 35.

The string of diodes 33 connected between the power supply 9 and the collector of the transistor 32 clamps the collector of the transistor 32 to a predetermined voltage, since the string of diodes maintains a constant voltage drop thereacross over the range of current which is drawn through it, as is more fully explained hereinafter, This voltage is chosen to be of such a value that the collector voltage of the transistor 32 cannot enter the saturation region regardless of the amount of current which is being drawn through the transistor 32. In the absence of the clamping action provided by the string of diodes 33, the bias applied to the base of the transistor 32 during marking intervals is sufficient to cause the transistor to saturate.

In order to more fully explain the manner in which the strings of diodes 33 and 37 achieve the foregoing clamping action to prevent saturation of the transistor 28, reference is made to FIG. 2 in which a typical characteristic curve X shows the voltage drop across the diodes plotted against the current flowing through them. The curve X is a nonlinear curve exhibiting the exponential voltage-current characteristic of the diodes. For increasing currents between O and a value A, the voltage drop across the diodes rises rapidly, but remains relatively constant for any additional increase in current between the value A and a second value B. The simple exponential curve X is contrasted with a curve Y which is a typical voltage-current curve for a linear resistor.

The voltage at which the plateau or relatively flat portion of the curve X occurs is established by the individual voltage drop across each diode and may be increased or decreased by correspondingly increasing and decreasing the number of diodes connected in series. For example, if the voltage drop for the applied currents between the values A and B for each diode is .5 volt, and a total voltage drop of 10 volts is desired, it is necessary merely to connect twenty such diodes in series and the total drop across them is the desired 10 volts.

It should be noted that the aforementioned current-voltage characteristics of the diodes are those which are achieved by operating the diodes in their forward current conducting direction. Since the diodes are operated in their forward current conducting direction, it is not necessary for them to exhibit good rectifying characteristics or blocking characteristics in the inverse direction; and consequently they may be of an inexpensive type, with the result that even the use of a large number of them in a string to achieve the desired voltage drop does not render the cost of the string prohibitive. The constant voltage characteristic of the diodes is utilized by operating the strings of diodes in the current regions between A and B.

These strings of diodes have been used in place of Zener diodes for one primary reason, namely, that when the current is increased from O to point A, the diode conducts throughout this region and the voltage drop thereacross rises exponentially to that at the point A. There are no sharp transitions or changes of conduction to cause the generation of RF noise since the voltage-current curve X has only gradual transitions or rounded wave form characteristics. A Zener diode, on the other hand, exhibits a sudden avalanche of current flow therethrough once the breakdown voltage across the diode is exceeded. This transition from nonconduction to conduction is sharp and generates RF noise which is intolerable in the low noise line keyer system of this invention.

As mentioned previously, the diodes 33, 37 and 39 are strings of series connected diodes, the number of which is determined by the voltage drop desired across them. In order to distinguish these and other strings of diodes from conventional single diodes, a circle is drawn around a conventional diode symbol to represent a string of diodes as pointed out hereinbefore.

As the current flow through the transistor 32 is increased from a low value at the beginning of a mark element up to the desired line current, the string of diodes is operated in the region between O and A as shown on curve X and little current flows through the diodes 33 since the potential drop in the portion of the circuit connected in parallel with the diodes 33 is less than the predetermined potential drop established across these diodes when they are operating in the current region shown between points A and B in FIG. 2. However, any tendency for the transistor 32 to draw more than the desired or predetermined line current through the line tends to cause the potential drop across this portion of the circuit to increase above that which is established by the string of diodes 33. As a consequence, any current in excess of the desired line current is drawn through the diodes 33 instead of the line, thereby maintaining the predetermined clamping potential on the collector of the transistor 32 and preventing the line current from increasing beyond a desired amount during the mark interval.

The string of diodes 39 connected between the positive side of the local source 9 and the line terminal 40 is also operated in the region shown between points A and B on curve X of FIG. 2 and has a potential drop thereacross to establish the same potential on the terminal 40 as is applied to the terminal 34 by the string of diodes 33. As a consequence, when the desired line current is flowing on the signal line, the keyer circuit of this invention presents effectively no impedance to the line current since the voltage drop which occurs in the circuit is supplied by the local power source 9.

When the keyer contacts 10 are open, the potential on the emitter of the transistor 22 and thus on the emitter of the transistor 29 drops from a high potential to a relatively lower potential as explained previously. This drop in potential is applied to the base of the transistor 32 and reduces the conduction of the transistor 32.

The string of diodes 37 connected in the emitter circuit of the transistor 32 acts to prevent the reduction in the bias potential applied to the base of the transistor from cutting the transistor off. This is accomplished by reducing the bias potential on the base of the transistor 32 to a point which causes the current flowing through the transistor and thus the diodes 37 to be at or slightly below the current required to operate the diodes at point A as shown on curve X of FIG. 2. The use of these diodes makes it possible to reduce the current flow through the transistor 32 to near zero without cutting the transistor off since the current at point A is extremely low while the emitter voltage is still relatively high as determined by the diodes 37. If the bias voltage applied to the base of the transistor 32 is reduced two or three volts beneath that required to cause the transistor to conduct current at point A of the diode curve X, the transistor 32 conducts current on the portion of the diode curve shown between O and point A on curve X of FIG. 2.

If the diodes 37 were not placed in this circuit, the curve Y, which is the linear curve of a conventional resistance, necessarily would be the curve upon which the voltage and current values would have to be determined. In order to reduce the current to the low level desirable in this modified keyer circuit, the bias voltage applied to the base of the transistor 32 would have to be reduced to a very low value near zero with little or no tolerances. If the voltage were dropped only slightly below that which is necessary to maintain this minimum current, the drop would very likely be sufficient to cut the transistor off which would cause the generation of intolerable RF interference for the applications in which this system is used.

In contrast, the inclusion of the string of diodes 37 makes it possible to attain the desired near zero minimum current during space intervals while using a system in which the bias potential applied to the base of the transistor 32 to obtain this minimum current may vary several volts without causing the transistor 32 to cut off.

The inductance 36 in conjunction with capacitors 41 and 42 acts as a filter to eliminate any RF noise which may have been generated in this terminal portion of the circuit. A resistor 43 is connected between the terminal 40 and the negative side of the power supply 13 to bias the string of diodes 39 into its constant voltage drop region.

In summary, the above operation of the invention will be described briefly for the mark and space intervals.

During the space intervals, the contacts 10 are opened which causes the transistor 21 to bias the transistor 22 to a relatively low state of conduction. As a consequence, a low potential is present on the emitter of the transistor 22; and this potential is applied through the emitter follower transistor 29 which in turn applies a low potential to the base of the transistor 32 to bias that transistor to near cutoff. However, the string of diodes 37 operates to prevent the transistor 32 from being fully cut off and a low, near zero current flows through the line from the battery 35, through the transistor 32, the inductor 36, the string of diodes 37, the resistor 38, the power supply 9, and the string of diodes 39 to the line terminal 40 which is connected to the negative side of the line battery 35. This current is of an extremely low magnitude and for all practical purposes may be considered as zero current insofar as operation of telegraph equipment connected to the line is concerned. It is to be noted that in conventional telegraph line keyers the line circuit is actually broken during space intervals by a switch and the zero current condition actually exists.

When the switch 10 is closed, representing a mark, the transistor 21 applies an increased positive potential to the base of the transistor 22 causing that transistor to conduct more heavily. As a result of this increased conduction the potential on the emitter of the transistor 22 rises and this rise in potential is applied through the emitter-follower transistor 29 to the base of the transistor 32 causing the transistor 32 to conduct heavily. The line current continues to flow through the same path as described previously for the current flow during the space condition, but the line current increases to the desired predetermined amount. This line current flowing for mark is of the same magnitude which would have been obtained from a conventional telegraph line keyer by the closing of a mechanical switch across the line terminals 34 and 40. The transistor 32 is caused to coduct more current than it is desired to draw through the line, but this increased current flows through the string of diodes 33 which clamp the collector of the transistor 32 to a potential outside of its saturation region.

It is evident from the above discussion that this line keyer is compatible with conventional telegraph systems. However, it has an important advantage over conventional keyers which open and close a mechanical switch across or in series with the line since it does not generate any RF noise or interference in the frequency range between 14 kilocycles and 100 megacycles having a voltage of over .07 microvolt. As a consequence of this highly desirable feature, the system of this invention may be used in sensitive telegraph applications having low RF noise requirements in which it would be impossible to use a standard telegraph line keyer.

Although a specific embodiment of this invention has been shown and described, various modifications and changes may occur to those skilled in the art without departing from the spirit and scope of the invention.

What is claimed is:

1. A low noise signal generator for applying signals to a transmission line, said generator including electronic switching means connected in said transmission line for increasing and decreasing the current flow through said line between a maximum value and a minimum value in response to signals representing information to be transmitted and means for maintaining said minimum value of current at a value other than zero.

2. A low noise line keyer for applying signals to a transmission line, said keyer including transistor switching means connected in said transmission line for increasing and decreasing the current flow through said line between maximum value and a minimum value in response to signals representing information to be transmitted and means for maintaining said switching means conductive at all times during operation of said line keyer.

3. A low noise signal generator for applying signals to a telegraph line, said signal generator including (a) a transistor having base, collector and emitter electrodes, (b) means for connecting said emitter and collector electrodes of said transistor in said line, (c) means connected to the base of said transistor for varying the conduction of said transistor in response to signals representing information to be transmitted to control the current flow through said line accordingly, (d) means for preventing said transistor from saturating, and (e) means for preventing said transistor from being driven to cutoff.

4. A signal generator for applying signals to a telegraph line, said signal generator including (a) a transistor having base, emitter and collector electrodes, (b) means for connecting the collector-emitter path of said transistor in said telegraph line, (c) means connected to the base of said transistor for varying the conduction of said transistor in response to signals representing binary information to be transmiltted, the current flow through said transistor being varied from a maximum value representing one state of said information to a minimum value greater than zero representing another state of said information, (d) diode means connected to the collector of said transistor for preventing said transistor from being driven into saturation, and (e) diode means connected to the emitter of said transistor for preventing said transistor from being driven to cutoff.

5. A low noise signal generator for applying signals to a telegraph transmission line including (a) a pair of contacts operated in response to binary information to be transmitted, said contacts being closed for one value of said binary information and being opened for another value of said binary information, (b) means for supplying said contacts with a low voltage and low current which are substantially lower than the voltage and current of the signals applied to said telegraph line, (c) a control transistor having base, emitter and collector electrodes, (d) means responsive to the opening and closing of said contacts for varying the conduction of said control transistor from a high level of conduction when said contacts are closed to a low level of conduction when said contacts are open, and (e) means for connecting the collector-emitter path of said control transistor in said telegraph line to vary the current conduction through said line in accordance with the conduction of said control transistor.

6. A signal generator according to claim 5 having (a) means connected to the collector of said control transistor to prevent said control transistor from saturating, and (b) means connected to the emitter of said transistor for preventing said transistor from being driven to cutoff.

7. A signal generator according to claim 6 in which said saturation prevention means and said cutoff prevention means comprise strings of series connected diodes.

8. A low noise telegraph signal generator for applying signals to a telegraph loop including (a) a control transistor having base, emitter and collector electrodes, (b) means for connecting the collector-emitter path of said control transistor in series in said telegraph loop, (c) transistor circuit means connected to the base of said control transistor for varying the conduction of said control transistor by varying the bias potential applied to said base from one to the other of two predetermined values in accordance with two different states of conduction of said transistor circuit means, (d) a pair of contacts, opened and closed in response to binary telegraph information to be transmitted, connected to said transistor circuit means for varying the conduction of said transistor circuit means between said two different states of conduction, in neither of which said transistor circuit means is in a state of nonconduction, (e) means connected to the collector of said control transistor for preventing said transistor from being driven into saturation when one value of said bias potential renders said transistor highly conductive, and (f) means connected to the emitter of said transistor for preventing the other value of said bias potential from driving said transistor to cutoff.

9. A signal generator according to claim 8 in which said saturation prevention means and said cutoff prevention means each comprises a string of series connected diodes poled to conduct current in their forward conduction direction.

References Cited by the Examiner

UNITED STATES PATENTS

| | | | |
|---|---|---|---|
| 2,937,236 | 5/1960 | Kundrotas | 178—70 |
| 3,064,141 | 11/1962 | Chou | 307—88.5 |
| 3,065,297 | 11/1962 | Wrathall | 178—70 |

NEIL C. READ, *Primary Examiner.*

ROBERT H. ROSE, *Examiner.*

A. J. DUNN, T. A. ROBINSON, *Assistant Examiners.*